A. MEUCCI.
Candle Mold.
No. 22,739.  Patented Jan. 25, 1859.
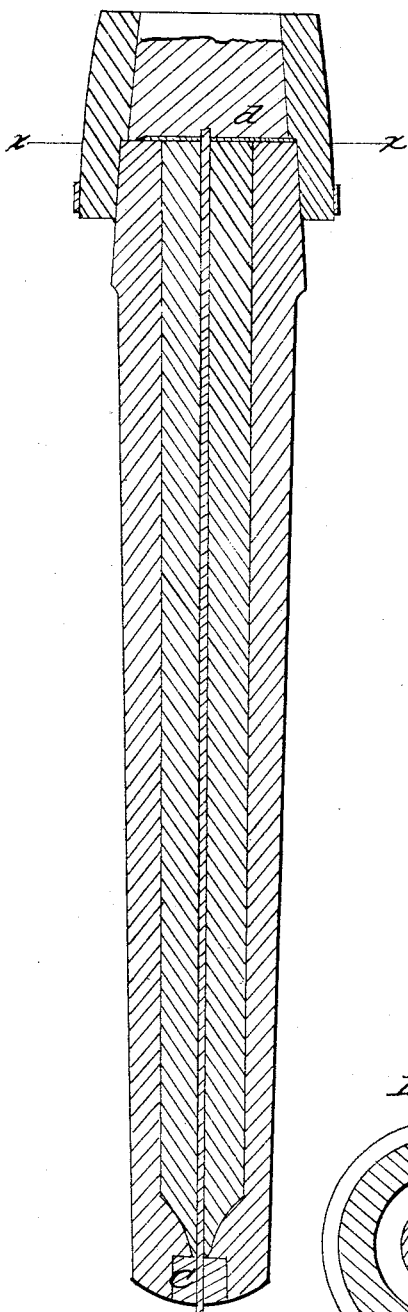
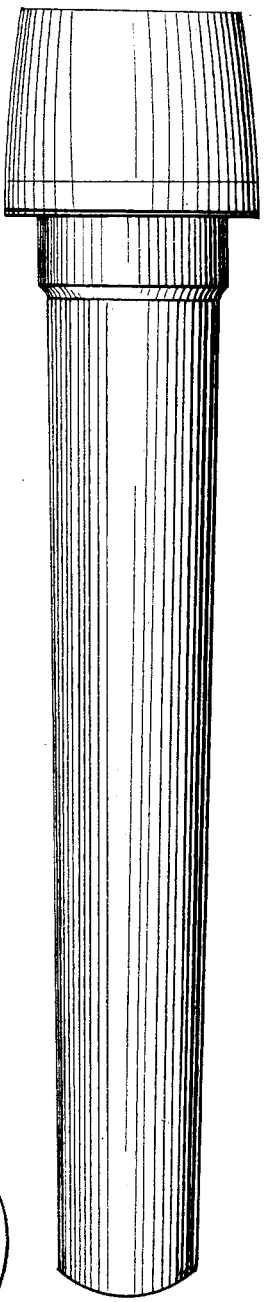
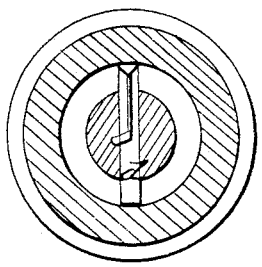

UNITED STATES PATENT OFFICE.

ANTONIO MEUCCI, OF CLIFTON, NEW YORK, ASSIGNOR TO D. B. LORINI.

MANUFACTURE OF CANDLES.

Specification of Letters Patent No. 22,739, dated January 25, 1859.

*To all whom it may concern:*

Be it known that I, ANTONIO MEUCCI, of Clifton, in the county of Richmond and State of New York, have invented a new and useful Improvement in the Manufacture of Candles, of which the following is a full, clear, and exact description, reference being had to the accompanying drawing, in which—

Figure 1 represents a side elevation of my improved candle mold, Fig. 2 represents a longitudinal section of the same and of a candle within it and Fig. 3 represents a cross section of the same at the line $x$ $x$ of Fig. 2.

My invention relates to the manufacture of mold candles and particularly to those which are formed of paraffin and of wax. Mold candles have hitherto been formed in molds of metal, and in the manufacture of candles of paraffin much trouble and difficulty has been experienced from the adhesion of the candle to the mold, which, so far as my own experience extends, has rendered the manufacture of candles of paraffin unprofitable. A careful study of the matter in connection with a series of experiments led me to the belief that the adhesion of the candle to a metal mold was due to the impervious nature of the metal, which prevents it from retaining the grease or other lubricating material, which may be used to cause the candle to separate from the mold; and I discovered that this adhesion may be obviated by the employment of a candle mold of a material sufficiently porous to retain oil or other lubricating material within its pores.

My invention consists in the method of forming mold candles by means of candle molds of a porous material saturated with a lubricating material, in contradistinction to the method now in general use of forming mold candles by means of candle molds of metal or other impervious material.

The porous material which I prefer as the material for my molds is ordinary plaster of Paris, such as is used in the manufacture of figures and other ornamental plaster work. I construct these molds by casting them in the manner well known to plaster workers in the shape shown in the drawing.

The mold consists of two parts, the staff A, or mold proper, which gives form to the candle; and the head B, which fits upon the staff, acts as a funnel to facilitate the pouring of the melted candle material, and retains a sufficient quantity thereof to supply the shrinkage in the candle in cooling. The lower end of the mold has a piece of India rubber $c$ cast in it, which is perforated to admit the wick, and which by its elasticity pinches the latter so that it may be strained sufficiently to keep it straight in the mold, and also prevents the escape of the candle material in casting. After the molds are formed they are saturated with some suitable lubricating material, after which they are ready for use. The saturating material which I prefer is sperm oil, but linseed oil, wax, stearin, or paraffin may be used for the purpose, the concrete fats being melted before saturation, and the operation being effected by dipping the molds into the material. I have also obtained good results by saturating the molds with an alcoholic solution of soap, in the proportion of two ounces of good white soap to a gallon of alcohol and water mixed in equal parts. I have even found that the molds will answer if saturated with water alone, but in this case the saturation has to be renewed after casting one or two candles while if a concrete fat or an oil be used, a single saturation is generally sufficient to keep the mold in a working condition until it is worn out or broken.

The molds after saturation may be used in a warm or cold state, or may be used singly, or arranged in a series in frames. The upper end of the wick is conveniently held by a slotted strip or bridge of tin plate $d$, which rests upon the staff A, and the operation of withdrawing one candle from the mold draws in the wick for the succeeding one.

In place of plaster of Paris any other suitable porous material may be used, and the mold may be formed by cutting it out of a block of the material, instead of by the process of casting; but whatever be the porous material used, it is necessary in all cases to saturate it previous to use with a lubricating material.

I am aware that molds of plaster of Paris or other porous materials partially or wholly saturated with grease have been used in the manufacture of articles of plaster of Paris and other ornamental objects, and therefore do not claim the invention of such molds or their employment in other arts but

What I claim as my invention or discov- ery in the candle manufacture and desire to secure by Letters Patent is—

The method of forming mold candles in saturated porous candle molds substantially as herein set forth, in contradistinction to the method in general use of forming them in candle molds of impervious metal.

In testimony whereof I have hereunto subscribed my name.

ANTO MEUCCI.

Witnesses:
 SAML. L. BADGLEY,
 WM. E. RIDER.